United States Patent
Rahman

(10) Patent No.: US 11,129,128 B2
(45) Date of Patent: Sep. 21, 2021

(54) DEVICE TO DEVICE COMMUNICATION FOR ESTABLISHING VOICE CALLS IN A 5G CELLULAR SYSTEM

(71) Applicant: T-Mobile USA, Inc., Bellevue, WA (US)

(72) Inventor: Muhammad Tawhidur Rahman, Bellevue, WA (US)

(73) Assignee: T-MOBILE USA, INC., Bellevue, WA (US)

(*) Notice: Subject to any disclaimer, the term of this patent is extended or adjusted under 35 U.S.C. 154(b) by 73 days.

(21) Appl. No.: 16/773,162

(22) Filed: Jan. 27, 2020

(65) Prior Publication Data

US 2021/0235409 A1 Jul. 29, 2021

(51) Int. Cl.
*H04W 88/06* (2009.01)
*H04W 64/00* (2009.01)
*H04W 76/50* (2018.01)
*H04W 4/021* (2018.01)

(52) U.S. Cl.
CPC ......... *H04W 64/003* (2013.01); *H04W 4/021* (2013.01); *H04W 76/50* (2018.02); *H04W 88/06* (2013.01)

(58) Field of Classification Search
CPC ... H04W 64/003; H04W 88/06; H04W 76/50; H04W 4/021
See application file for complete search history.

(56) References Cited

U.S. PATENT DOCUMENTS

| | | | |
|---|---|---|---|
| 10,405,145 B2 * | 9/2019 | Edge | G01S 5/02 |
| 10,580,283 B1 * | 3/2020 | Al-Yami | G08B 27/001 |
| 2016/0249193 A1 * | 8/2016 | Edge | H04L 67/42 |
| 2017/0366955 A1 * | 12/2017 | Edge | H04M 11/04 |
| 2018/0035276 A1 * | 2/2018 | Kang | H04W 48/08 |
| 2018/0262867 A1 * | 9/2018 | Edge | G01S 5/0236 |
| 2019/0306324 A1 * | 10/2019 | Al-Mehdar | H04W 4/24 |
| 2020/0314702 A1 * | 10/2020 | Rahman | H04W 36/0069 |
| 2021/0022073 A1 * | 1/2021 | Kwok | H04W 76/15 |
| 2021/0056786 A1 * | 2/2021 | De La Garza | H04L 63/0884 |

* cited by examiner

*Primary Examiner* — Julio R Perez
(74) *Attorney, Agent, or Firm* — Loeb & Loeb, LLP

(57) ABSTRACT

A method for making device to device calls is disclosed. A 5G cellular network that is New Radio (NR) enabled is provided in a first geographic location. A first user equipment (UE) device that is NR enabled in the first geographic location is identified. A request to make a voice call using the NR from the first UE device that is NR enabled is received. The request originates from a second UE device that is not NR enabled. The first UE device is within a range of the second UE device. In response to receiving the request to make the voice call, the voice call is sent over the 5G communications network.

20 Claims, 3 Drawing Sheets

DEVICE TO DEVICE COMMUNICATION FOR ESTABLISHING VOICE CALLS IN A 5G CELLULAR SYSTEM

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cellular network technology continues to improve, with the latest iteration being 5G. Among other things, 5G allows for voice calls and data over New Radio (NR). NR is a newly developed technology that enables wireless communication at higher frequency rates. However, only user equipment (UE) devices that are NR enabled can make voice calls over a fully integrated 5G NR network. Unfortunately, most existing UE devices such as cell phones, laptops, and tablets, even if compatible with existing 4G/5G networks, are not NR enabled. Thus, if a subscriber is using a UE device that does not have native voice calling over NR and the subscriber is located in a NR only coverage area, e.g., there is no overlapping 4G LTE or 3G UMTS coverage, then those subscribers would not be able to make voice calls. This is particularly problematic in an emergency situation, where making a voice call is critical and not being able to do so may result in damage to property, injury to people or animals, or even loss of life.

SUMMARY

A method for making device to device calls is disclosed. A 5G communications network that is New Radio (NR) enabled is provided in a first geographic location. A first user equipment (UE) device that is NR enabled in the first geographic location is identified. A request to make a voice call using the NR from the first UE device that is NR enabled is received. The request originates from a second UE device that is not NR enabled. The first UE device is within a range of the second UE device. In response to receiving the request to make the voice call, the voice call is sent over the 5G communications network.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
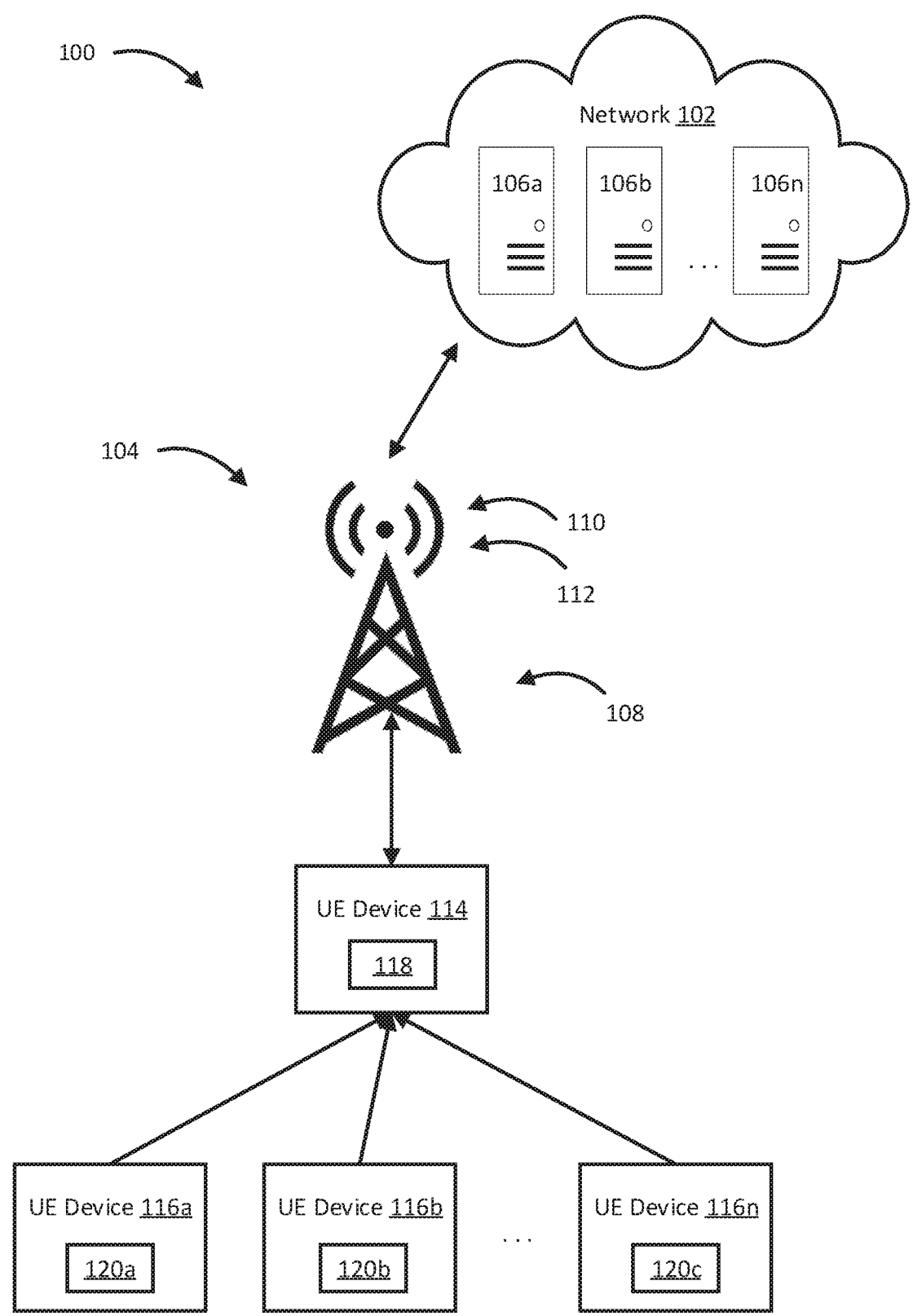
FIG. 1 is a schematic of an embodiment of a telecommunications system in accordance with the current disclosure.

Cellular telecommunication network technology has significantly evolved of the past 20 years, from 2G to 3G to 4G, and now to 5G. While 2G cellular networks are actively being phased out to make room for 5G technology, 3G cellular networks are currently still in use worldwide along with 4G and in some areas 5G. Each will be discussed at a high level herein.

3G is the third generation of wireless mobile telecommunications technology. 3G cellular networks provide for information transfer rates of at least 144 kbits/s and implements several standards including Universal Mobile Telecommunications System (UMTS). In a 3G network, data is sent over a packet switched (PS) network, whereas voice calls are sent over a circuit switched (CS) network. Thus, for voice calls a circuit has to be established between two parties through a radio access network such as UMTS radio access network. As wireless mobile telecommunication technology continues to be developed, 3G is slowly being phased out worldwide to make room for 5G networks.

4G is the fourth generation of wireless mobile telecommunications technology. 4G is now found throughout the world and provides internet speeds up to 500 times faster than 3G; thus allowing for HDTV support, high-quality video calls, and fast mobile browsing. 4G implements several standards including Long-Term Evolution (LTE). LTE increased the capacity and speed of wireless communication for mobile devices by using a different radio interface together with network improvements. These improvements, however, eliminated the CS domain. Therefore, in a LTE 4G network, both data and voice calls are PS based.

As demand on cellular networks continues to increase, the need for a faster and more efficient technology has led to the development of fifth generation, or 5G, wireless mobile telecommunications technology. 5G is faster and more efficient than 4G, providing data speeds that are as much as 100 times faster than 4G. 5G can also support more users and new technologies such as driverless cars and connected home devices.

In order to provide these advances, a new air interface called New Radio was developed for 5G cellular networks. NR uses two frequency ranges Frequency Range 1 (FR1), which is below 6 GHz, and Frequency Range 2 (FR2), which is 24 Ghz or higher. In this way, more devices can be supported as the network provides for the transmittal of data across a number of parallel, narrow bands, instead of a single wide ban. However, because higher frequency signals cannot penetrate solid objects easily and do not travel large distances, 5G base stations need to be placed every few hundred meters to service FR2.

In addition, although 5G is initially being offered through improvements to existing LTE architecture, standalone 5G NR networks will eventually replace dual compatible 4G/5G networks in order to fully realize the improvements 5G NR offer. Unfortunately, 5G NR is not backwards-compatible. Thus, as standalone 5G NR networks increase, the need for NR enabled devices will increase as most current UE devices are not NR compatible.

As discussed above, mobile telecommunication technology continues to evolve and improve, with the latest development being 5G NR. Because 5G NR has specific requirements and is not backwards compatible, making voice calls using current non-NR enabled UE devices is not possible in a NR-only coverage area. Not being able to place voice calls is problematic for users or subscribers, particularly, when the user or subscriber is in an emergency situation and time is of the essence. Therefore, there exists a need to establish device to device communication so that a voice call can be made from non-NR enabled UE device when in a NR-only coverage area.

Although the descriptions below may be directed to an exemplary implementation incorporating a 5G cellular telecommunication network and system, the techniques described herein are applicable to other communications networks and systems that may require device to device communication in order to transmit voice calls, particularly, in an emergency situation.

FIG. 1 illustrates an exemplary telecommunications system 100. The telecommunications system 100 may comprise a 5G cellular network 102 and a cell tower 104, which are provided in a first geographic location. The 5G communications network 102 may be NR enabled. In an embodiment, the 5G communications network is NR enabled, but does not include LTE or UMTS coverage.

The 5G communications network 102 may include one or more servers 106a, 106b, . . . , 106n (collectively referred to as servers 106). The one or more servers 106 may be in communication or otherwise coupled to the cell tower 104. The cell tower 104 may include a base station 108, an antenna 110, and a New Radio (NR) interface 112. The NR interface 112 may be 5G enabled. In an embodiment, the NR interface does not support LTE or UMTS communication.

Figure 3:
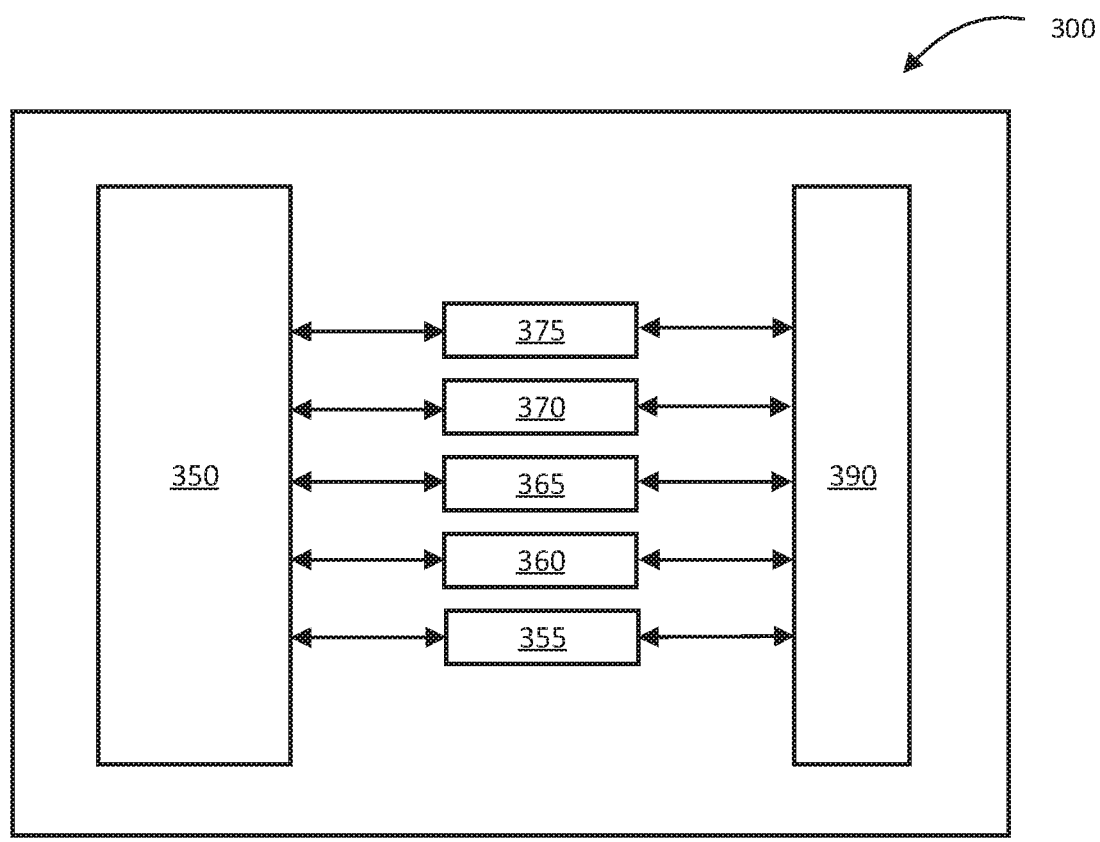
FIG. 3 is a schematic of an exemplary device in accordance with the current disclosure.

The one or more servers 106 may include a processor and a memory in communication or otherwise coupled to the processor as shown in FIG. 3. The memory may store executable instructions, which may be used to physically configure the processor 350 as is further described in relation to FIG. 3.

The cell tower 104 may be in communication with a first User Equipment (UE) device 114. The first UE device 114 may be located in the first geographic location and may be 5G enabled. The first UE device 114 may also be NR enabled. The first UE device 114 may have a proximity sensor 118 that is configured to locate other devices within a first radius. The first radius may be any of 0 to 1000 meters or more. The first UE device 114 may be a mobile phone, tablet, or laptop.

One or more second UE devices 116a, 116b, . . . 116n (referred to individually or collectively "second UE device 116") may also be located in or near the first geographic location. The one or more second UE devices may be 2G, 3G, 4G, or 5G enabled. In one embodiment, the second UE devices are 5G enabled, but do not support NR. The one or more second UE devices 116 may have respective proximity sensors 120a, 120b, . . . , 120n that are configured to locate other devices within a second radius. The second radius may be any of 0 to 1000 meters or more. The one or more second UE devices 116 may be a mobile phone, tablet, or laptop.

Figure 2:
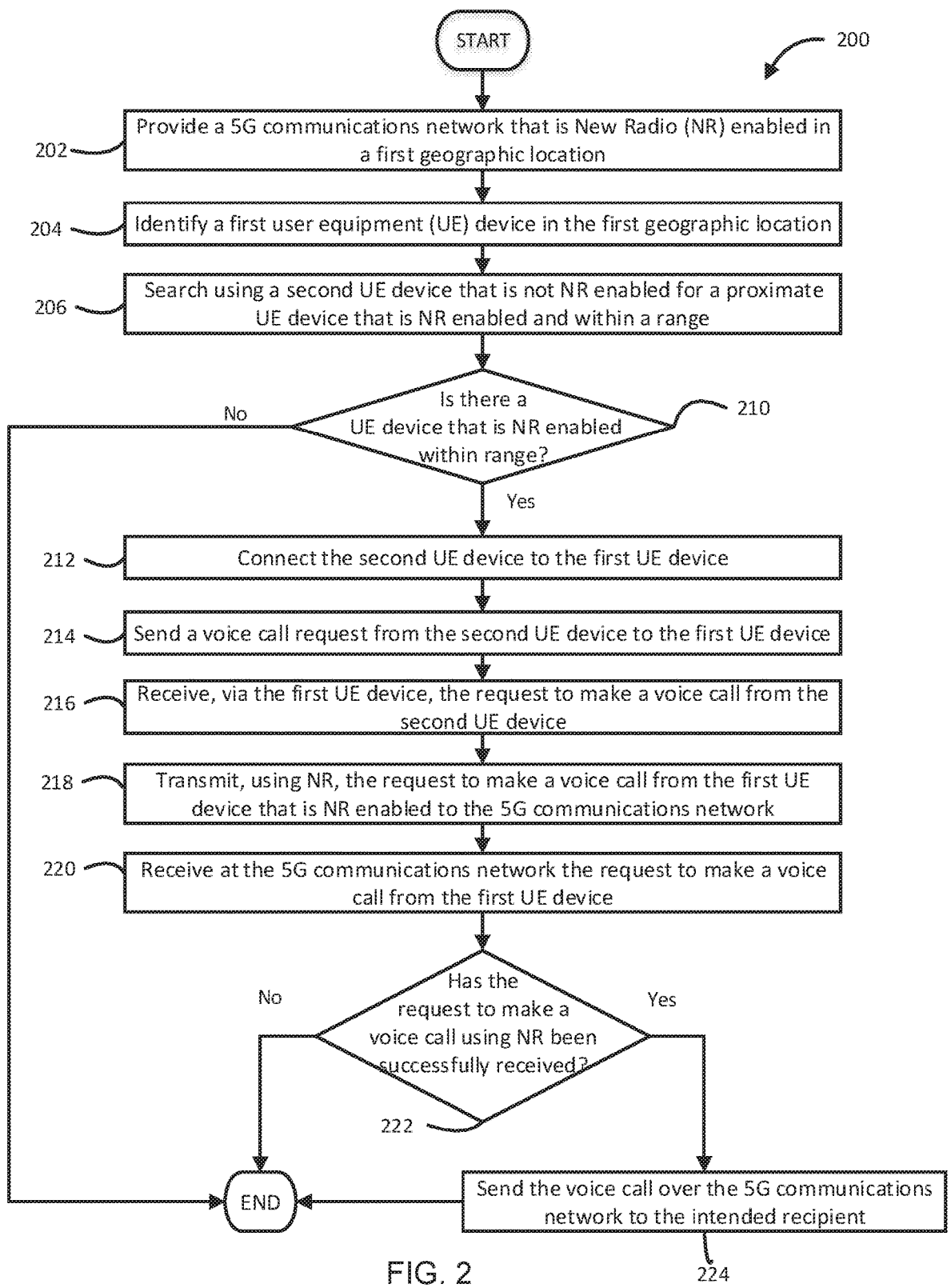
FIG. 2 is a flowchart of a method for device to device voice calls in accordance with the current disclosure.

FIG. 2 is a flowchart of an exemplary method 200 for device to device communication. At a block 202, a 5G communications network (e.g., 5G communications network 102) may be provided in a first geographic location. In one embodiment, the 5G communications network 102 may be NR enabled.

At a block 204, a first UE device such as first UE device 114 may be identified in the first geographic location. The first geographic location may be a geographic area that is within a neighborhood, town, city or county, or it may be a location that is defined by an area within a certain radial distance from a cell tower, such as cell tower 104. The radial distance may be, for example, 0 to 1000 meters.

At a block 206, a second UE device (e.g., any of second UE devices 116a,b, n), may search for another UE device that is within a range. In an embodiment, the second UE device 116 is not NR enabled. The range may be a distance, for example, a distance from the second UE device 116 to the first UE device 114. In an embodiment, the range may be from 0 to 1000 meters.

At a block 210, it may be determined whether there is a UE device that is NR enabled within range of the second UE device 116. If there is no UE device that is NR enabled in range, the method ends.

If there is a UE device that is NR enabled in range, for example, the first UE device 114, then the method may proceed to a block 212. At block 212, the second UE device 116 may connect or otherwise form a communication link with the first UE device 114. The second UE device 116 may connect to the first UE device 114 via proximity sensing technology. For example, the proximity sensing technology may be Proximity Services (ProSe) technology developed by the 3rd Generation Partnership Project (3GPP).

Once the first and second UE devices 114, 116 are connected or have formed a communication link, the method may proceed to a block 214. At block 214, a request to make a voice call may be communicated from the second UE device 116 to the first UE device 114. At a block 216, the first UE device 114 may receive the request to make the voice call from the second UE device 116.

The request to make a voice call may then be sent or transmitted to the 5G communications network via the first UE device 114 at a block 218. In an embodiment, the second UE device 116 may not be able to send the voice call request directly to the 5G communications network 102 because the second UE device 116 may not be NR enabled. In another embodiment, the second UE device 116 may be outside the coverage area of the cell tower 104 but within range of the first UE device 114. By using the first UE device 114 to communicate the voice call request to the 5G communications network 102, a user or subscriber may use the second UE device 116 to make a voice call. In this way, if there is an emergency situation a user of the second UE device 116 can call for help.

In a further embodiment, the second UE device 116 may not be within range of the first UE device 114. A third UE device may be available that is within range of the second UE device 116 and the first UE device 114. The third UE device may or may not be able to send voice calls directly to the 5G communications network 102. The third UE device may be able to relay the voice call request from the second UE device 116 to the first UE device 114; the first UE device 114 may then communicate the voice call request to the 5G communications network. In this way, the third UE device acts as an intermediary relay point between the second UE device 116 and the first UE device 114. Additional intermediary relay points (e.g., fourth UE device, fifth UE device, etc.) are also contemplated.

At a block, 220, a request to make a voice call using NR from the first UE device that is NR enabled may be received by the 5G communications network 102.

At a block 222, whether the request to make the voice call has been successfully received by the 5G communications network 120 may be determined. If the request is not successfully received, then the method may end. If the request to make the voice call is successfully received by the 5G communications network 120, then the method may proceed to a block 224. At block 224, the voice call may be sent over the 5G communications network 120.

The current method and systems disclosed herein are beneficial to both cellular network providers and subscribers of cellular network services. By providing a way for voice calls to be made by UE devices that are NR enabled, cellular network providers are able to provide seamless coverage to their subscribers even if the subscribers do not have a NR enabled UE device and are in a NR-only coverage area. This is, particularly, critical when the user or subscriber is in an emergency situation. Subscribers benefit by being able to place voice calls even when in a NR-only coverage areas; thus, enjoying continuous service even when in a non-emergency situation.

Other benefits of the method and systems disclosed include public safety, vehicle to things, and vehicle to vehicle communication. The disclosed methods and systems provide a bridge between non-NR enabled devices and NR enabled devices with backward compatibility thereby opening non-NR enabled devices to NR bases services using NR enabled devices as a medium.

FIG. 3 may be an example computing device 300, for example, UE devices 114 and 116 or servers 106. The computing device 300 may be physically configured to interact or communicate with other computing devices via a communication network. The computing device 300 may have a processor 350 (e.g., processor(s) 106) that is physically configured according to computer executable instructions. The computing device 300 may have a power supply 355 such as a battery which may be rechargeable. The computing device 300 may also have a sound and video module 360 which assists in displaying video and sound and may turn off when not in use to conserve power and battery life. The computing device 300 may also have volatile memory 365 and non-volatile memory 370 as well as internal storage 375 or external storage. The computing device 300 may have an input/output bus 390 that shuttles data to and from various user input devices such as a keyboard, mouse, speakers, or other inputs. It also may control communicating with other computing devices and system components, either through wireless or wired devices. Of course, this is just one embodiment of the computing device 300 and the number and types of computing devices 300 is limited only by the imagination.

In accordance with the provisions of the patent statutes and jurisprudence, exemplary configurations described above are considered to represent one embodiment of the disclosure. However, it should be noted that the teachings of the disclosure may be practiced otherwise than as specifically illustrated and described without departing from its spirit or scope.

The computing devices, computers, routers, and/or servers described herein may be computers that may have, among other elements, a microprocessor (such as from the Intel Corporation, AMD or Motorola); volatile and non-volatile memory; one or more mass storage devices (e.g., a hard drive); various user input devices, such as a mouse, a keyboard, or a microphone; and a video display system. The user computing devices, computers, and servers described herein may be running on any one of many operating systems including, but not limited to WINDOWS, UNIX, LINUX, MAC OS, or Windows (XP, VISTA, etc.). It is contemplated, however, that any suitable operating system may be used for the present disclosure. The servers may be a cluster of web servers, which may each be LINUX based and supported by a load balancer that decides which of the cluster of web servers should process a request based upon the current request-load of the available server(s).

The computing devices, computers, routers, and servers described herein may communicate via communications networks, including the Internet, WAN, LAN, Wi-Fi, cellular including 2G, 3G UMTS, 4G LTE, and 5G NR, or other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described figures, including any servers, point of sale terminals, computing devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware, software, or a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow diagram, a narrative, and/or in any other manner that provides sufficient structure for those of ordinary skill in the art to implement the recited process and its equivalents.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment. One or more features from any embodiment may be combined with one or more features of any other embodiment without departing from the scope of the disclosure. A recitation of "a", "an" or "the" is intended to mean "one or more" unless specifically indicated to the contrary. Recitation of "and/or" is intended to represent the most inclusive sense of the term unless specifically indicated to the contrary.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method for making device to device voice calls, comprising:
    providing a 5G communications network that is New Radio (NR) enabled in a first geographic location;
    identifying a first user equipment (UE) device that is NR enabled in the first geographic location;
    receiving a request to make a voice call using NR from the first UE device that is NR enabled, wherein the request originates from a second UE device that is not NR enabled, and wherein the first UE device is within a range of the second UE device, and
    in response to receiving the request to make the voice call, sending the voice call over the 5G communications network.

2. The method of claim 1, wherein the first UE device is 5G enabled.

3. The method of claim 1, wherein the second UE device is 5G enabled.

4. The method of claim 1, wherein the first UE device is a mobile phone.

5. The method of claim 1, wherein the second UE device is a mobile phone.

6. The method of claim 1, wherein the 5G communications network does not include LTE or UMTS coverage.

7. The method of claim 1, wherein the range is a distance.

8. The method of claim 7, wherein the distance is 1000 meters.

9. The method of claim 1, further including the step of:
    searching using the second UE device for a proximate UE device that is within the range and is NR enabled, wherein the proximate UE device is the first UE device; and
    connecting the second UE device to the first UE device.

10. The method of claim 1, wherein the voice call is made in response to an emergency.

11. A system for making device to device voice calls having infrastructure comprising:
    a cell tower including:
        a base station;
        an antenna; and
        a New Radio (NR) network interface;
    a server in communication with the cell tower, the server including:
        a server network interface in communication with the NR network interface;
        a processor coupled to the server network interface; and
        a memory coupled to the processor, the memory storing executable instructions that when executed cause the server to:
            identify a first user equipment (UE) device in a geographic location;
            receive a request to make a voice call using the NR network interface from a first UE device that supports voice calls over the NR network interface, wherein the request originates from a second UE device that does not support voice calls over the NR network interface, wherein the second UE device connects to the first UE device to access the NR network interface, and
            in response to receiving the request to make the voice call, sending the voice call over the NR network interface.

12. The system of claim 11, wherein the NR network interface is 5G enabled.

13. The system of claim 12, wherein the 5G NR network interface does not include LTE or UMTS coverage.

14. The system of claim 11, wherein the first UE device is 5G enabled.

15. The system of claim 11, wherein the second UE device is 5G enabled.

16. The system of claim 11, wherein the first UE device is a mobile phone.

17. The system of claim 11, wherein the second device locates the first device using a proximity sensor.

18. The system of claim 17, wherein the proximity sensor is configured to locate other devices within a radius.

19. The system of claim 18, wherein the radius is 0 to 1000 meters.

20. The system of claim 11, wherein the voice call is made in response to an emergency.

* * * * *